United States Patent [19]

Hiramitsu et al.

[11] Patent Number: 5,433,473
[45] Date of Patent: Jul. 18, 1995

[54] PAD MOUNTING STRUCTURE FOR AIR BAG DEVICE

[75] Inventors: Tetsushi Hiramitsu; Ichizo Shiga; Tadashi Yamamoto; Hiroshi Ogawa, all of Aichi, Japan

[73] Assignee: Toyoda Gosei Co., Ltd., Japan

[21] Appl. No.: 873,180

[22] Filed: Apr. 24, 1992

[30] Foreign Application Priority Data

| Apr. 26, 1991 | [JP] | Japan | 3-097683 |
| Apr. 30, 1991 | [JP] | Japan | 3-097773 |
| Apr. 30, 1991 | [JP] | Japan | 3-097774 |
| Apr. 30, 1991 | [JP] | Japan | 3-098490 |

[51] Int. Cl.⁶ .................................. B60R 21/16
[52] U.S. Cl. ......................... 280/728.3; 280/731
[58] Field of Search .......... 280/728 B, 731, 728 R, 280/732; 428/68

[56] References Cited

U.S. PATENT DOCUMENTS

| 3,276,416 | 10/1966 | Dirks et al. | 116/28 |
| 3,901,579 | 8/1975 | Demerest | 350/98 |
| 3,999,521 | 12/1976 | Puiello | 119/96 |
| 4,328,533 | 5/1982 | Paredes | 362/108 |
| 4,534,619 | 8/1985 | Bedford | 350/98 |
| 4,836,576 | 6/1989 | Werner et al. | 280/728 B X |
| 4,852,907 | 8/1989 | Shiraki et al. | 280/728 B |
| 4,903,986 | 2/1990 | Cok et al. | 280/728 B |
| 4,969,663 | 11/1990 | Nowacki | 280/808 |
| 5,064,217 | 11/1991 | Shiraki | 280/731 X |
| 5,069,477 | 12/1991 | Shiraki | 280/728 B X |
| 5,125,683 | 6/1992 | Nakajima | 280/731 |
| 5,172,931 | 12/1992 | Baba et al. | 280/728 B |
| 5,172,932 | 12/1992 | Watanabe et al. | 280/728 B |
| 5,176,439 | 1/1993 | Kawamura | 362/108 |
| 5,183,289 | 2/1993 | Zeller et al. | 280/728 B |
| 5,186,490 | 2/1993 | Adams et al. | 280/728 B |

FOREIGN PATENT DOCUMENTS

| 0461276 | 12/1991 | European Pat. Off. | 280/728 B |
| 51-025342 | 2/1976 | Japan . | |
| 2143250 | 12/1990 | Japan . | |
| 2144856 | 12/1990 | Japan . | |
| 0186452 | 8/1991 | Japan | 280/728 B |
| 0193547 | 8/1991 | Japan | 280/728 B |

*Primary Examiner*—Margaret A. Focarino
*Assistant Examiner*—Christopher P. Ellis
*Attorney, Agent, or Firm*—Cushman, Darby & Cushman

[57] ABSTRACT

In order to simplify the fabrication process, form a lightweight air bag device and increase safety by reliably preventing damage to an insert during the inflation of an air bag, a pad according to the present invention includes a pad body made of a soft synthetic resin, such as urethane, and an insert 14 formed of a synthetic resin plate material with a shape-retaining characteristic. The insert 14 includes a substantially square cylindrical base portion 16 and two opening portions 18A, 18B integrally connected to the base portion via hinge portions 17A, 17B. Arcuate, gradual shape-changing portions 23, 24 are formed at the boundary edge portions between the base portion 16 and the hinge portions 17A, 17B and at boundary edge portions between the opening portions 18A, 18B and the hinge portions 17A, 17B, respectively to distribute stresses and minimize breakage.

3 Claims, 9 Drawing Sheets

PAD MOUNTING STRUCTURE FOR AIR BAG DEVICE

BACKGROUND OF THE INVENTION

1. Field of the Invention

The present invention relates to a pad for an air bag device.

2. Description of the Related Art

In typical air bag devices, an arrangement is provided such that the pad body itself is allowed to be broken so that the air bag can protrude outwardly when the air bag inflates, and so that an insert integrally formed with the pad body bursts open in fixed directions with the pad body held by the insert. Conventionally, the insert is embedded in the pad body, as shown in Japanese Utility Model Application Laid-Open No. 144856/1990. The insert is primarily comprised of a rigid annular base portion formed from metal and secured to a device frame so as to surround an outer peripheral portion of the air bag, and a net connected to the base portion via mounting plates so that the insert is located over the air bag. The net holds the pad body, and the insert is burst open in a state in which the pad body is thus held by the net.

However, since the aforementioned insert is comprised of a plurality of component parts including the base portion, the mounting plates, and the net, the number of component parts used is great. Hence, the fabrication of the insert itself has hitherto required much time and labor. In addition, because the net does not have a shape-retaining memory, when the net is set in a mold for forming the pad, its position and shape are not fixed in the mold. Accordingly, the production of the conventional pad has been difficult, and since a metal is used for the base portion, the weight of the pad has been disadvantageously great.

SUMMARY OF THE INVENTION

Accordingly, an object of the present invention is to provide a pad for an air bag device which can be easily produced, contributes to providing an air bag device which is lightweight, and is capable of reliably preventing the insert from being damaged when the air bag is inflated, and thereby overcomes the above-described drawbacks of the conventional device.

To this end, in accordance with a first aspect of the invention, the insert is formed from a plate material of synthetic resin, and the insert includes a base portion secured to a device frame around the air bag and opening portions connected to the base portion via hinge portions so as to be located above the air bag, and wherein a gradual shape-changing portion for preventing the concentration of stress is formed in each of the boundary edge portions between the opening portions and the hinge portions.

In accordance with a second aspect of the invention, the insert is formed from a plate material of synthetic resin, and the insert includes a base portion secured to a device frame around the air bag and opening portions connected to the base portion via hinge portions so as to be located above the air bag, and wherein a gradual shape-changing portion for preventing the concentration of stress is formed in each of the boundary edge portions between the base portion and the hinge portions.

Accordingly, in accordance with the first and second aspects of the invention, the insert as a whole is formed integrally by means of a plate material of synthetic resin. Since the number of component parts used is small, the fabrication of the insert itself is simple. In addition, the setting of the insert in a mold is facilitated, so that the fabrication of the pad is simple. In addition, since the insert as a whole is made of the synthetic resin, the pad for the air bag device can be made lightweight. Furthermore, although an upward tensile force acts on ends of the hinge portions between the base portion and the respective opening portions when the opening portions are opened in conjunction with the inflation of the air bag, since the gradual shape-changing portion is formed at the boundary edge portion between each opening portion and the corresponding hinge portion and/or at the boundary edge portion between the base portion and the respective hinge portion, tensile stresses are not concentrated on these portions and thus, cracks do not form in the ends of the hinge portions.

Furthermore, to attain the above-described object, in accordance with a third aspect of the invention, an insert is formed from a plate material of synthetic resin, and the insert includes a base portion secured to a device frame around the air bag and opening portions connected to the base portion via hinge portions so as to be located above the air bag, and wherein circular or substantially circular through holes are respectively formed in opposite end portions of each of the hinge portions.

Accordingly, in accordance with this aspect of the invention, the insert as a whole is formed integrally by means of a plate material made of a synthetic resin. Since the number of component parts used is small, the fabrication of the insert itself is simple. In addition, the setting of the insert in a mold is facilitated, so that the fabrication of the pad is simple. In addition, since the insert as a whole is made of the synthetic resin, the pad for the air bag device can be made lightweight. Furthermore, although cracks may occur at ends of the hinge portions between the base portion and the respective opening portions when the opening portions are opened in conjunction with the inflation of the air bag, the cracks reach the through holes at the opposite ends of the hinge portions, so that the breaking energy is dissipated. At the same time, since the through holes are circular or substantially circular, the breaking stress is mitigated thereat, and do not progress further than that.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of a first embodiment of the present invention.

Figure 2:
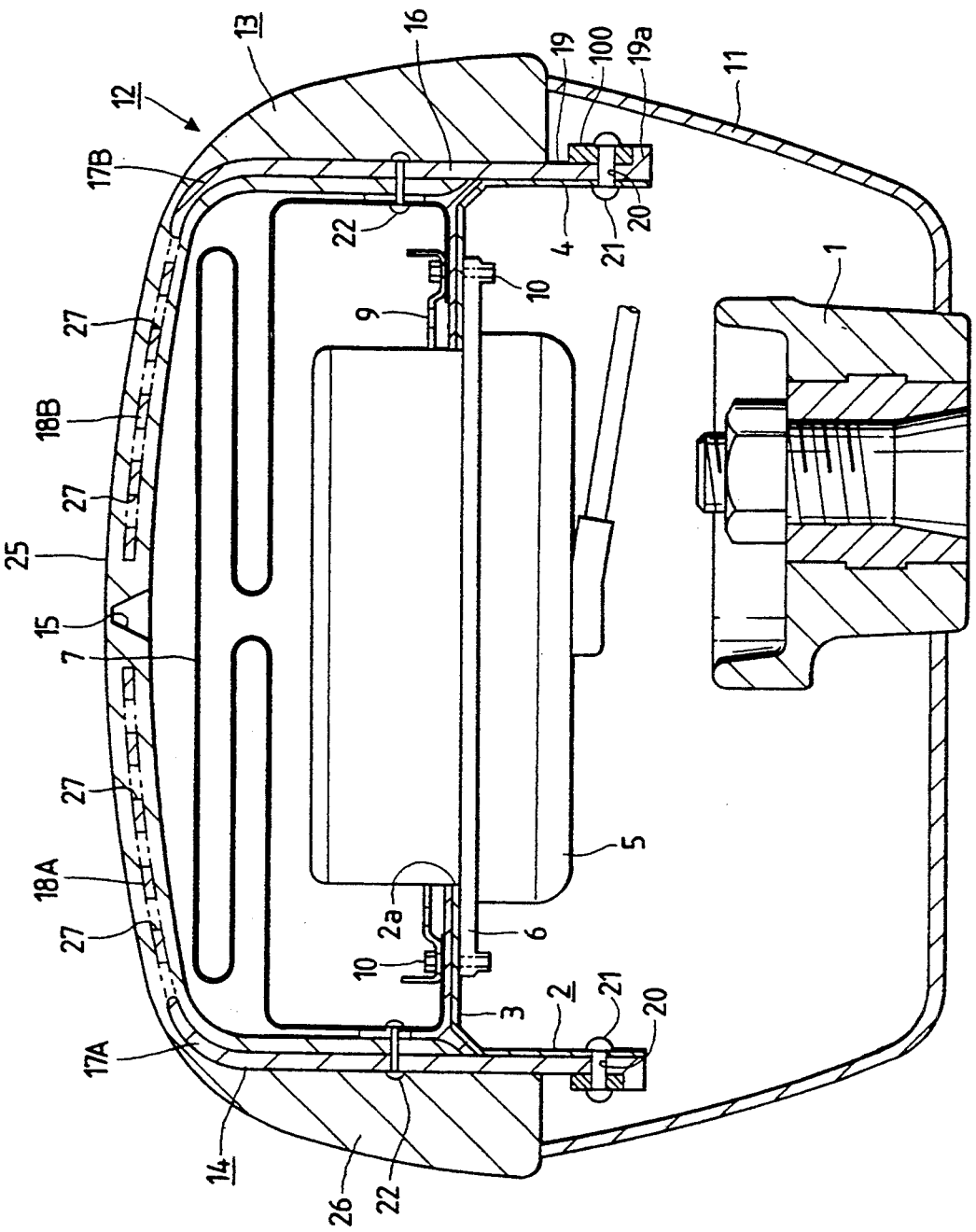
FIG. 2 is a side cross-sectional view of the air bag device.

As shown in FIG. 2, a metallic bag holder 2 serving as a device frame is supported on a core bar 1 of a steering wheel (not shown) via a horn switch mechanism and the like (not shown). This bag holder 2 is comprised of a substantially square and annular top plate 3 having an insertion hole 2a at its center and a pair of side plates 4 extending downwardly from an outer peripheral edge of the top plate 3.

An inflator 5 is inserted from below the insertion hole 2a formed in the bag holder 2, and an upper surface of a flange 6 formed around an outer periphery of the inflator 5 abuts against a lower surface of the top plate 3 of the bag holder 2. An air bag 7 is disposed in such a manner as to cover an upper portion of the inflator 5, and a lower end portion of the air bag 7 is held on an upper surface of the top plate 3 of the bag holder 2 by means of an annular retainer 9. The retainer 9 and the lower end portion of the air bag 7, together with the flange 6, are secured to the top plate 3 by means of bolts 10.

A lower cover 11 is disposed in such a manner as to cover an upper portion of the core bar 1, and an upper surface of the lower cover 11 is open. A pad 12 is disposed over the lower cover 11 in such a manner as to cover the air bag 7. The pad 12 has a substantially square upper wall 25 and a side wall 26 extending downward from an outer peripheral edge of the upper wall 25, and thus has a substantially box-shaped configuration with its lower surface open. The pad 12 comprises a pad body 13 formed of a soft synthetic resin such as urethane through injection molding, and an insert 14 embedded in the pad body 13 and formed of a plate material made of a synthetic resin having a shape-retaining characteristic.

A substantially H-shaped U-groove 15 is formed in an inner surface of the upper wall 25 of the pad, so that the upper wall 25 can be readily broken along the U-shaped groove 15 when the air bag 7 is inflated.

Figure 3:
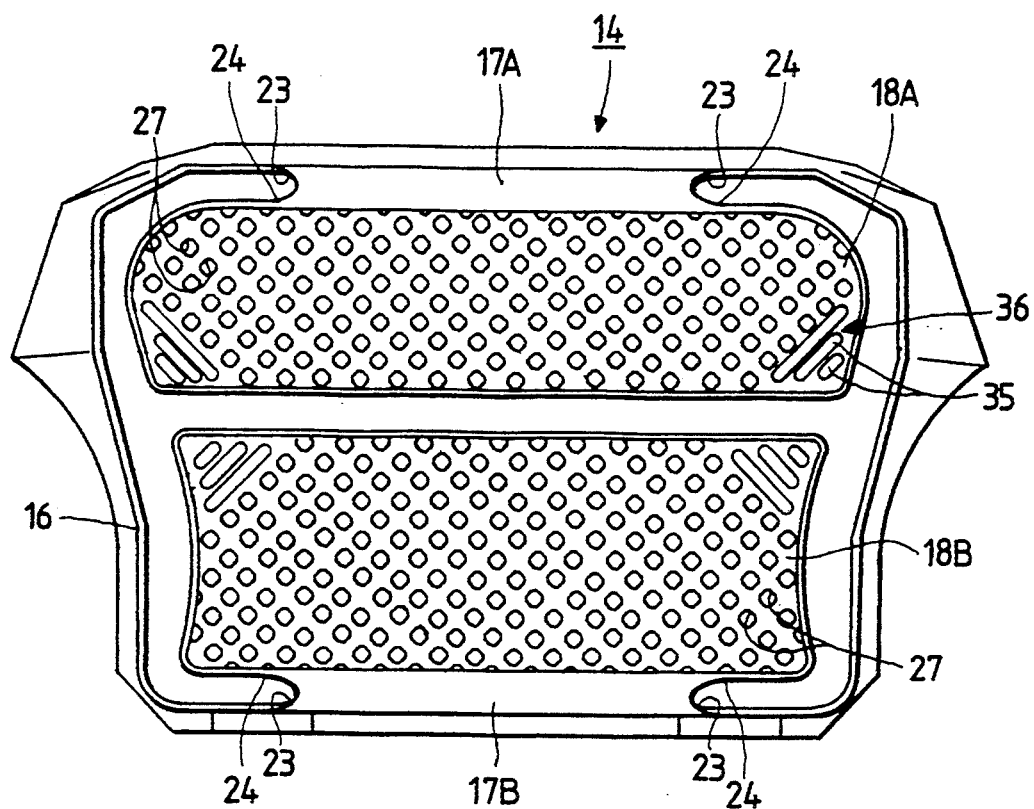
FIG. 3 is a plan view of the insert.
Figure 4:
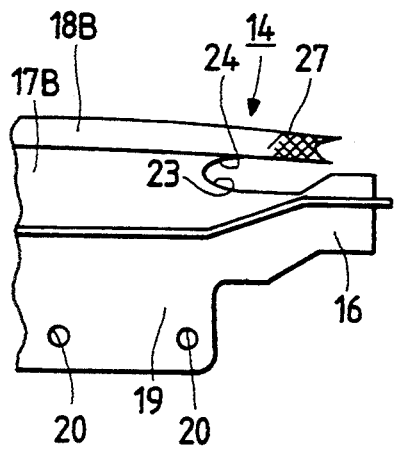
FIG. 4 is a partial front elevational view thereof.
Figure 5:
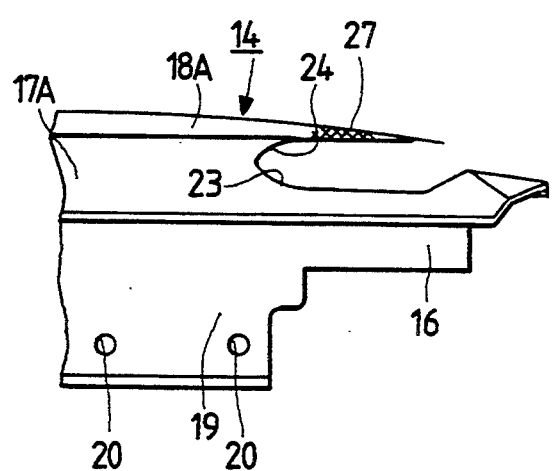
FIG. 5 is a partial rear view thereof.

As shown in FIGS. 1 to 5, the insert 14 is comprised of a substantially square, cylindrical base portion 16 disposed in the side wall 26 of the pad, and two opening portions 18A, 18B disposed in the upper wall 25 of the pad and connected integrally to the upper rim of the base portion 16 via hinge portions 17A, 17B. The opening portions 18A, 18B are arranged such that their respective outer edges lie adjacent the H-shaped U-groove 15, and so that they are opposed to each other. The opening portions 18A, 18B are adapted to be burst open upwardly with the hinge portions 17A, 17B as pivot axes, respectively, so as to allow the air bag 7 to project upwardly as viewed in FIG. 2. At the same time, the opening portions 18A, 18B are adapted to hold the pad body 13. A plurality of through holes 27 are formed in both opening portions 18A, 18B in the thickness direction thereof. Furthermore, as shown in FIG. 3, sensitivity improving portions 36 serving as sensitivity improving means and respectively having three slits 35 are provided in both opening portions 18A, 18B at corners thereof which are at farthest from the hinge portions 17A, 17B. These sensitivity improving portions 36 are made more lightweight and softer than the remaining portions of the opening portions 18A, 18B. In addition, rivets 22 are embedded in the side wall 26 of the pad, and a lower portion of the air bag 7 is secured to the pad 12 by means of the rivets 22.

Figure 8:
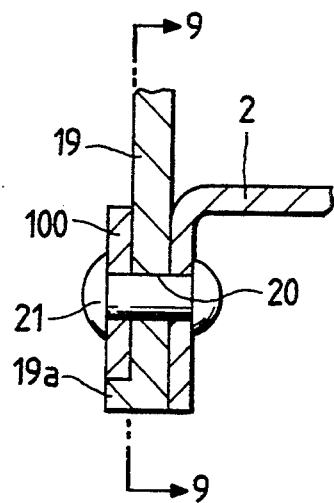
FIG. 8 is an enlarged partial cross-sectional view of the pad mounting structure for the air bag device with respect to a holder.
Figure 9:
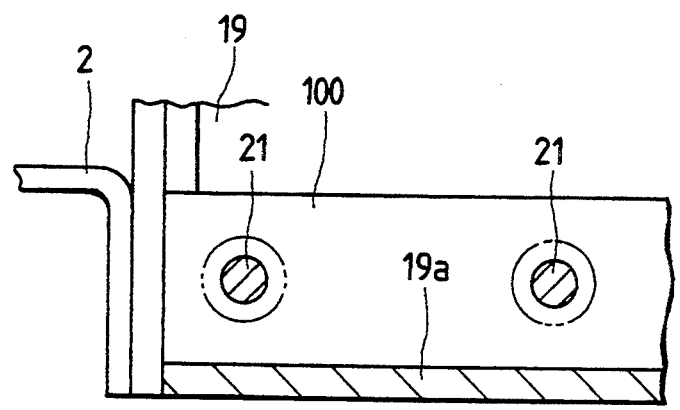
FIG. 9 is a partial cross-sectional view taken along the line 9—9 in FIG. 8.

As shown in FIGS. 8 and 9, a pair of mounting plates 19 are respectively formed integrally with lower ends of a pair of side plates, disposed in front and in rear in the frame, in such a manner as to project downward therefrom. A plurality of mounting holes 20 are formed in each mounting plate 19. A rib-like projection 19a is formed so as to project from an outer surface of the lower end of the mounting plate 19. An abutment plate 100 made of a metal plate such as steel or aluminum is disposed so as to abut against the projection 19a and the outer surface of the mounting plate 19. In this state, a plurality of rivets 21 serving as calking members are inserted into the abutment plate 100 and into the side plate of the holder 2 through the mounting holes 20 formed in the mounting plate 19, and as ends of the rivets 21 are calked, the mounting plate 19 of the insert 14 is fastened and secured between the metallic holder 2 and the abutment plate 100.

In this embodiment, as described above, the mounting plate 19 of the insert 14 formed of a synthetic resin is made to abut against the outer side surface of the metallic holder 2, and the metallic abutment plate 100 is made to abut against the outer surface of the mounting plate 19 of the insert 14. In this state, the abutting plate 100, the mounting plate 19, and the holder 2 are fastened and secured together by means of the rivets 21. For this reason, during the operation of calking the rivets 21, the large load caused by calking is not applied in a concentrated manner to portions of the mounting plate 19 surrounding the rivets 21, and that load is distributed over a wide area of the mounting plate 19, via the abutment plate 100. Accordingly, even if the insert is formed of a synthetic resin, breakage such as cracking does not occur in portions of the mounting plate 19 surrounding the rivets 21 and, thus, the insert 14 can be fixed securely to the holder 2.

In this embodiment, the rib-like projection 19a for engaging the lower end of the abutment plate 100 is provided on the outer surface of the lower end of the mounting plate 19 of the insert 14, as described above. Therefore, when the air bag 7 is inflated with gas generated by the inflator 5, and the upper wall of the pad 12 is consequently burst open into two pieces which are opened toward the front and the rear, respectively, even if a strong upward tensile load acts on the pad 12, that load is not concentrated on the portions of the mounting plate 19 surrounding the rivets 21, but is transmitted to the metallic abutment plate 100 via the projection 19a in a distributive manner. Accordingly, even when the pad 12 is broken, there is no possibility of breakage, such as cracking, of the portions of the mounting plate 19 surrounding the rivets 21.

As shown in FIG. 1 and FIGS. 3 to 5, at opposite ends of the respective hinge portions 17A, 17B, arcuate, gradual shape-changing portions 23, 24 are formed at the boundary edge portions between the base portion 16 and the hinge portions 17A, 17B and at the boundary edge portions between the opening portions 18A, 18B and the hinge portions 17A, 17B. The base portion 16 and the opening portions 18A, 18B are connected to each other smoothly via the gradual shape-changing portions 23, 24.

In the pad for the air bag device in accordance with this embodiment, the overall insert 14 embedded in the pad body 13 is formed as a unit by means of a synthetic resin. Since the number of components used can be reduced, the insert 14 itself is easy to fabricate, and since no metal is used, the insert 14 is lightweight. Moreover, since the insert 14 has a plate-like shape and, hence, has a shape-retaining characteristic, when the insert 14 is set in a mold for forming the pad 12, the position and shape of the insert 14 can be easily set in the mold, so that the molding of the pad 12 is easy, which in turn contributes to ease of production.

Figure 1:
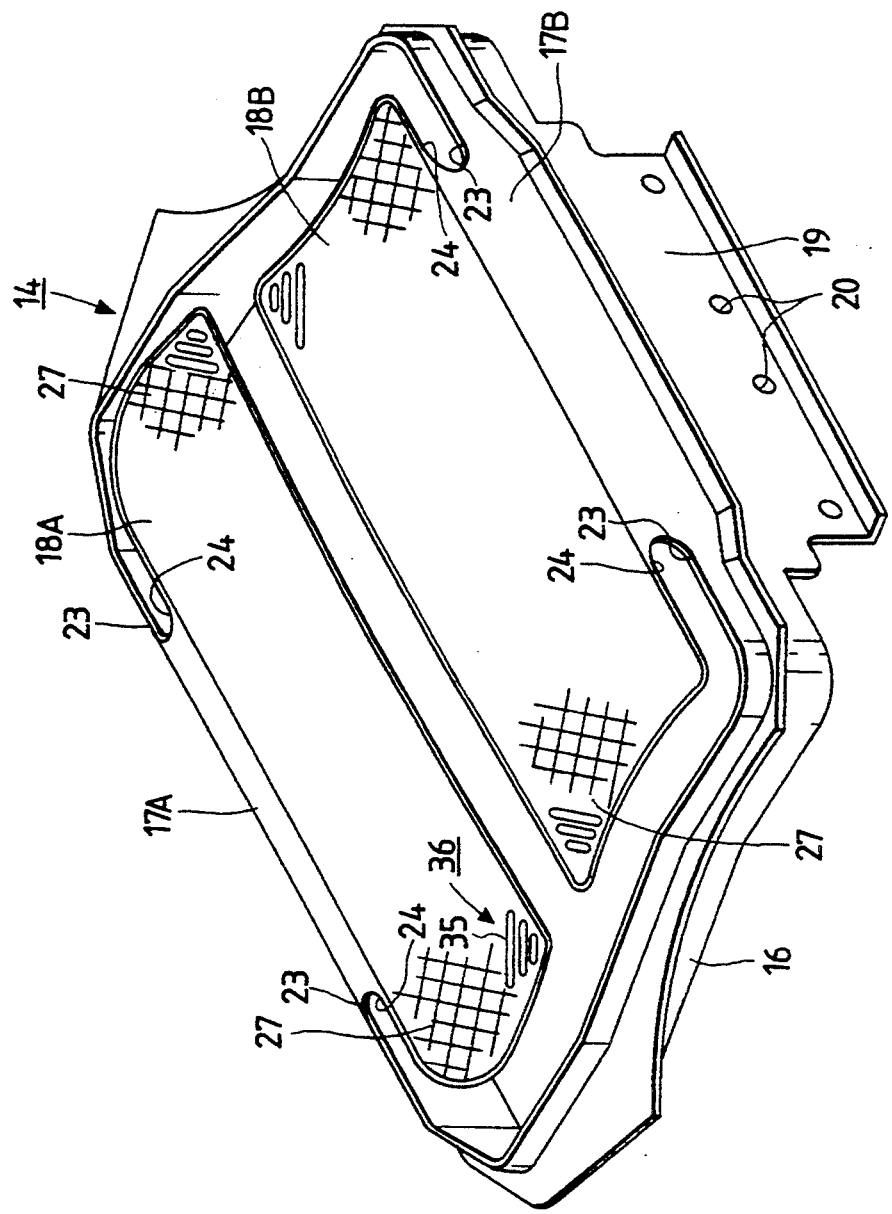
FIG. 1 is a perspective view of an insert in a pad for an air bag device in accordance with a first embodiment of the present invention.

When the air bag 7 is inflated with gas from the inflator 5, the pad body 13 is broken at the U-groove 15 portion, and is burst open upwardly as viewed in FIG. 1, so that the inflated air bag 7 projects outside upwardly as viewed in FIG. 2, i.e., toward a vehicle occupant.

At this time, the opening portions 18A, 18B are bent or curved mainly at the hinge portions 17A, 17B, and an upward tensile force acts on the hinge portions 17A, 17B. In this embodiment, since the arcuate, gradual shape-changing portions 23, 24 are formed at the boundary edge portions between the base portion 16 and the hinge portions 17A, 17B and at the boundary edge portions between the opening portions 18A, 18B and the hinge portions 17A, 17B, tensile stresses are not concentrated at the boundary edge portions, so that fractures do not occur at opposite ends of the respective hinge portions 17A, 17B. Accordingly, when the air bag 7 is inflated, the opening portions 18A, 18B do not separate from the base portion 16.

It should be noted that the present invention is not restricted to the foregoing embodiment, and an arrangement may be alternatively provided such that the gradual shape-changing portions 23, 24 are formed solely in the boundary edge portions between the base portion 16 and the hinge portions 17A, 17B are solely in the boundary edge portions between the opening portions 18A, 18B and the hinge portions 17A, 17B, or the gradual shape-changing portions 23, 24 may be formed by continuously changing the thickness of the boundary edge portions. Thus, a variety of changes may be made in the arrangement of various parts or portions without departing from the spirit of the present invention.

As the air bag 7 is inflated, the opening portions 18A, 18B are bent upwardly at the hinge portions 17A, 17B and are pushed open together with the pad 12. There may be times when the pad is opened up to where the occupant's arms and the like are located. However, since the aforementioned sensitivity improving portions 36 are provided in the opening portions 18A, 18B remote from the hinge portions 17A, 17B, although a soft touch may be imparted to the occupant, substantially no injury or discomfort is imparted to him or her when the air bag 7 is inflated.

Figure 6:
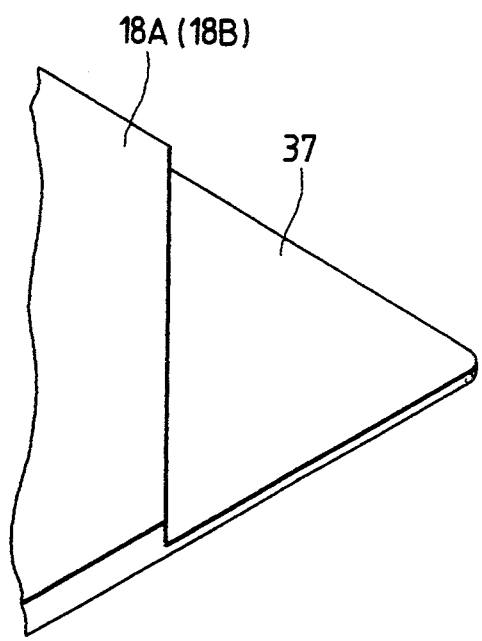
FIG. 6 is a perspective view of another modification of the insert in the pad for the air bag in accordance with the present invention.
Figure 7:
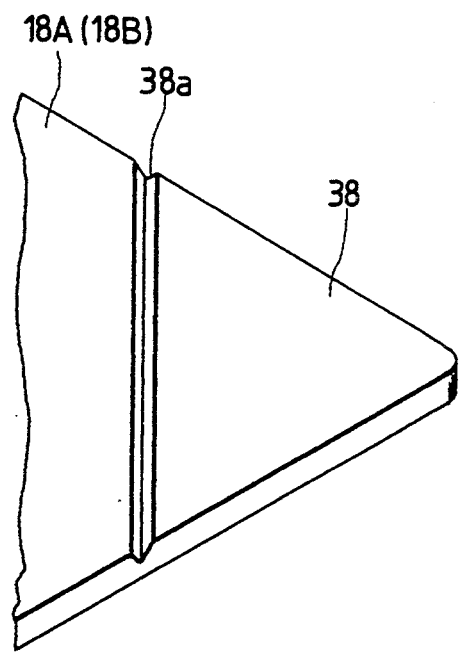
FIG. 7 is a perspective view of still another modification of the insert in the pad for the air bag in accordance with the present invention.

Although in the above-described embodiment the sensitivity improving portions 36 are formed by means of the slits 35, sensitivity improving portions 37 serving as the sensitivity improving means may be provided by decreasing the thickness of the corners of the opening portions 18A, 18B, as shown in FIG. 6, or sensitivity improving portions 38 may be made flexible by providing constricted portions 38a, as shown in FIG. 7.

Figure 10:
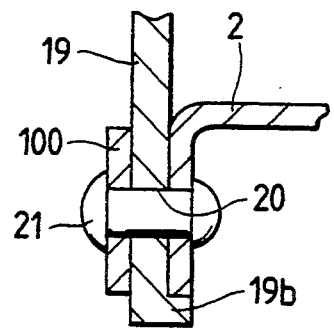
FIG. 10 is a partial cross-sectional view illustrating a modification of the pad mounting structure for the air bag device in accordance with the first embodiment of the present invention.
Figure 11:
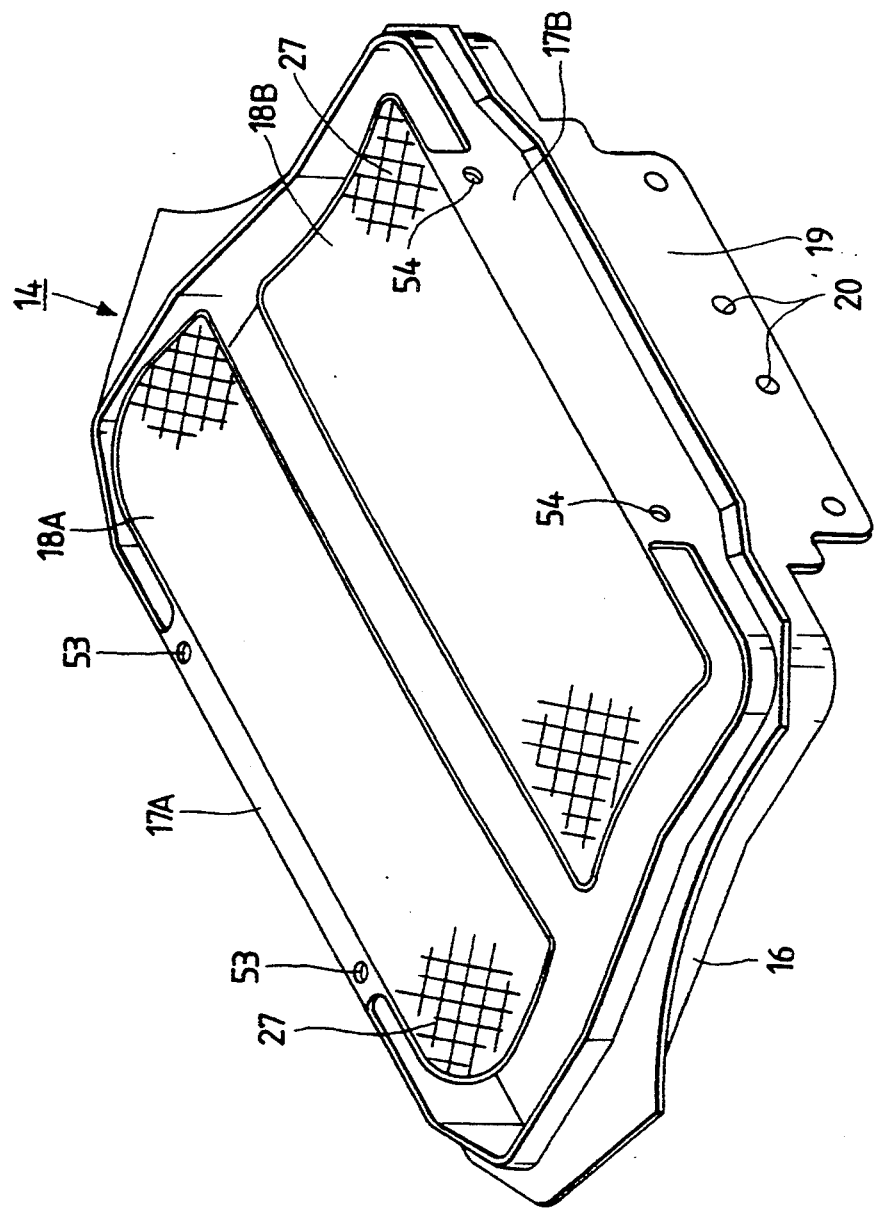
FIG. 11 is a perspective view of the insert in the pad for the air bag device in accordance with a second embodiment of the present invention.

Furthermore, an arrangement may be provided as shown in FIG. 10 in which the synthetic resin insert 14 is fastened and secured to the metallic device frame (bag holder 2) by means of calking members (rivets 21). In this manner, when a large load is applied to portions of the insert 14 surrounding the calked portions, those portions are reliably prevented from becoming broken.

More particularly, referring now to FIG. 10, a description will be given of a modification of the structure of FIGS. 8 and 9. In this modification, a rib-like projection 19b is formed in such a manner as to project from an inner surface of the lower end of the mounting plate 19 of the insert 14 so that the rib-like projection 19b engages the lower end of the holder 2. For that reason, with this structure, when a strong upward tensile load acts on the pad 12 during the inflation of the air bag 7, the load is transmitted in a distributed manner to the metallic holder 2 via the projection 19b. Accordingly, in this modification as well, it is possible to prevent the likelihood of breakage, such as cracking, in the portions of the mounting plate 19 surrounding the rivets 21.

Next, a description will be given of a second embodiment of the present invention with reference to FIGS. 11 to 16. It should be noted that the same elements as those used in the description of the first embodiment will be denoted by the same reference numerals.

Figure 16:
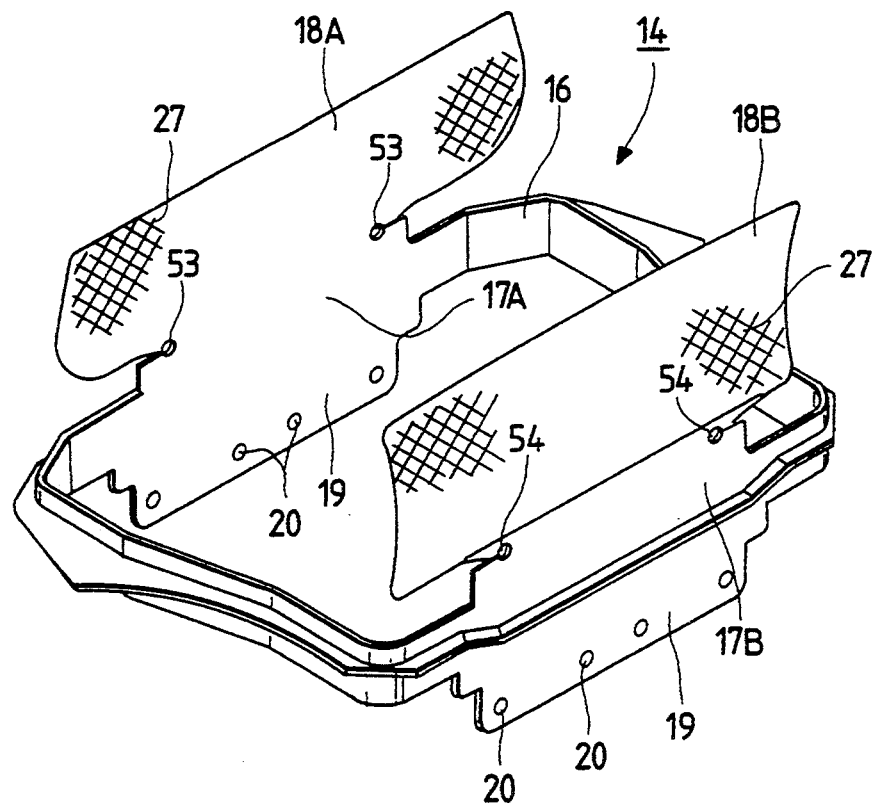
FIG. 16 is a perspective view illustrating a state in which opening portions of the insert are burst open.

As shown in FIGS. 11 to 16, substantially circular through holes 53, 54 are respectively formed in opposite end portions of the hinge portions 17A, 17B. Thus, as shown in FIG. 16, when the upper wall 25 of the pad is broken due to the inflation of the air bag 7, the opening portions 18A, 18B are burst open with the hinge portions 17A, 17B as centers or pivot axes, respectively. Since large tensile forces act on the hinge portions 17A, 17B, a crack can occur in the opposite ends thereof. However, when the crack reaches the through hole 53, 54, the stress for breaking is mitigated and does not progress further.

In the pad for the air bag device in accordance with this embodiment, the overall insert 14 embedded in the pad body 13 is formed as a unit by means of a synthetic resin. Since the number of components used can be reduced, the insert 14 itself is easy to fabricate, and since no metal is used, the insert 14 is lightweight. Moreover, since the insert 14 has a plate-like shape and has a shape-retaining characteristic, when the insert 14 is set in a mold for forming the pad 12, the position and shape of the insert 14 can be easily set in the mold, so that molding the pad 12 is easy, which in turn contributes to ease of production.

Figure 12:
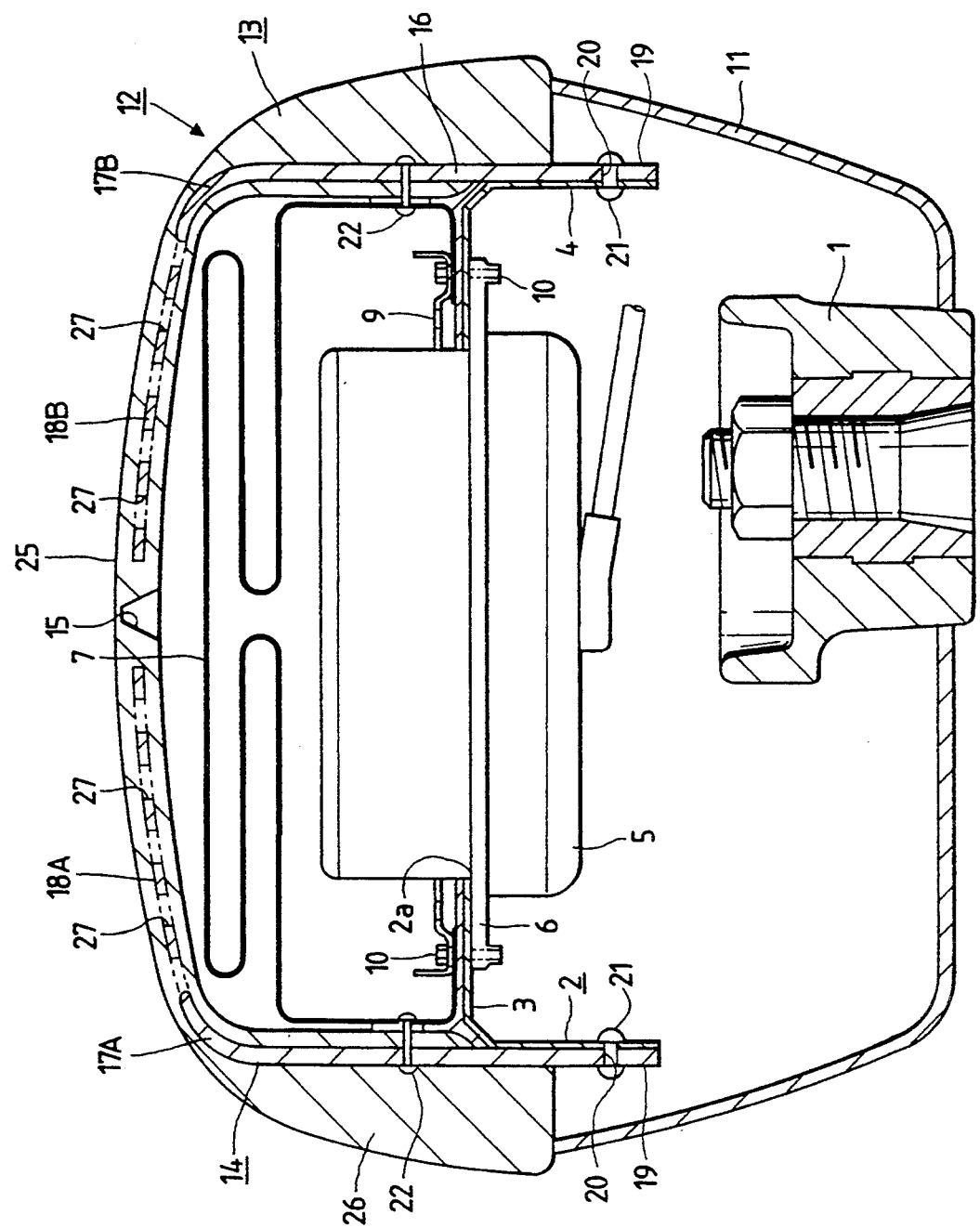
FIG. 12 is a side cross-sectional view of the air bag device shown in accordance with the second embodiment.

When the air bag 7 is inflated with gas from the inflator 5, the pad body 13 is broken at the U-groove 15 portion, and is burst open upwardly, as viewed in FIG. 12, so that the inflated air bag 7 projects upwardly, as viewed in FIG. 12, i.e., toward the vehicle occupant.

Figure 13:
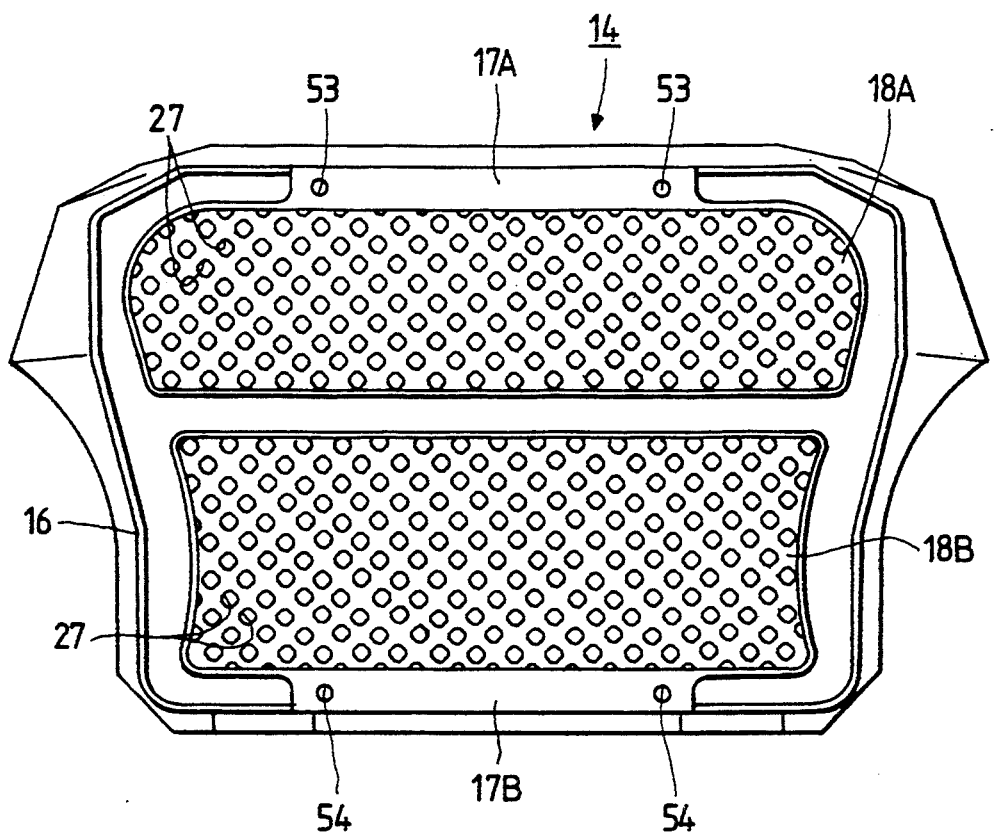
FIG. 13 is a plan view of the insert shown in FIG. 15.
Figure 14:
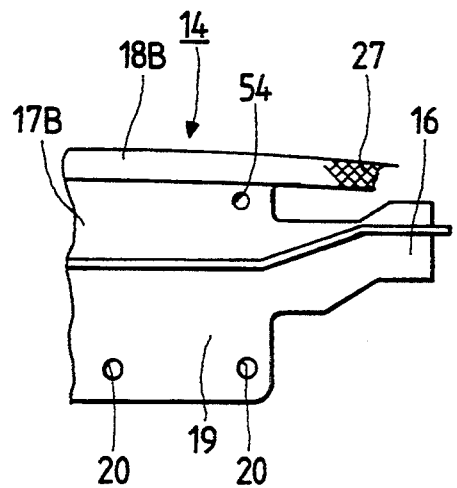
FIG. 14 is a partial front elevational view thereof.
Figure 15:
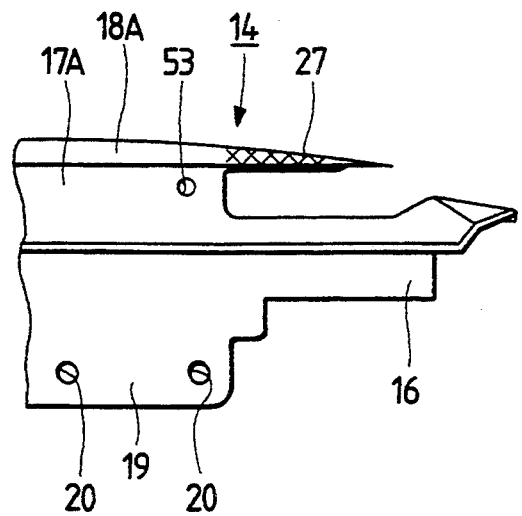
FIG. 15 is a partial rear view thereof.

At this time, as shown in FIG. 13, the opening portions 18A, 18B are bent or curved mainly at the hinge portions 17A, 17B, and an upward tensile force acts on the hinge portions 17A, 17B, with the result that a crack may occur in each of the hinge portions 17A, 17B starting from each opposite end thereof, causing breakage starting from the opposite ends. In this case, however, since the circular through holes 53, 54 are formed at opposite ends of the hinge portions 17A, 17B, even if cracks occur in the opposite ends of the hinge portions 17A, 17B, when the cracks reach the through holes 53, 54, the stress for breakage is mitigated. In addition, until the cracks reach the through holes 53, 54, the breaking energy is consumed and dissipated substantially, and is substantially attenuated when the cracks reach the through holes 53, 54. For this reason, the cracks do not progress further than that inwardly from the through holes 53, 54. Accordingly, the opening portions 18A, 18B are prevented from being separated from the base portion 16 when the air bag 7 is inflated.

It should be noted that the present invention is not restricted to the above-described embodiment, and the arrangement may be alternatively provided such that the through holes 53, 54 are formed in an elliptical shape, or a plurality of through holes 53, 54 are arranged at the opposite ends of the hinge portions 17A, 17B in the longitudinal direction of the hinge portions 17A, 17B or in another direction. Thus, various changes may be made to the arrangement of various parts or portions without departing from the spirit of the present invention.

As described above, the present invention offers an outstanding advantage in that it is possible to provide a pad for an air bag device which can be easily produced, which contributes to the formation of a lightweight air bag device, and is capable of reliably preventing an insert from being damaged when the air bag is inflated.

What is claimed is:

1. A pad for an air bag device comprising:
   a pad body formed of a soft synthetic resin, said pad body having an upper wall with a groove along which said upper wall can be readily broken and a side wall extending from the peripheral edge of said upper wall; and
   an insert embedded in said pad body and formed of a synthetic resin for reinforcing said pad body, said insert having:
   opening portions embedded in said upper wall,
   a base portion embedded in said side wall,
   hinge portions for connecting said opening portions and said base portion,
   corner portions of said opening portions remote from said hinge portions each having a plurality of slits defined therein, said slits each substantially connecting edges of said opening portions which define said respective corner portion,
   wherein said base portion abuts against an outer surface of said frame and a metallic abutment plate abuts against an outer surface of said base portion, said abutment plate, said base portion, and said frame being fastened together by means of a plurality of calking members, and wherein a projection for engaging a lower end of at least one of said abutment plate and said frame is formed on a lower end of said base portion.

2. A pad for an air bag device comprising:
   a pad body formed of a soft synthetic resin, said pad body having an upper wall with a groove (15) along which said upper wall can be readily broken and a side wall extending from the peripheral edge of said upper wall; and
   an insert embedded in said pad body and formed of a synthetic resin for reinforcing said pad body, said insert having:
   opening portions embedded in said upper wall,
   a base portion embedded in said side wall,
   hinge portions for connecting said opening portions and said base portion,
   corner portions of said opening portions remote from said hinge portions each having a plurality of slits defined therein, said slits each substantially connecting edges of said opening portions which define said respective corner portion,
   wherein said hinge portions include means at each longitudinal end portion thereof for preventing a concentration of stress, said means for preventing, including a smoothly curved edge portion,
   wherein said means for preventing a concentration of stress comprises at least one substantially circular through hole formed in each of said hinge portions adjacent longitudinal ends thereof.

3. A pad for an air bag device comprising:
   a pad body formed of a soft synthetic resin, said pad body having an upper wall with a groove along which said upper wall can be readily broken and a side wall extending from the peripheral edge of said upper wall; and
   an insert embedded in said pad body and formed of a synthetic resin for reinforcing said pad body, said insert having:
   opening portions embedded in said upper wall,
   a base portion embedded in said side wall,
   hinge portions for connecting said opening portions and said base portion,
   corner portions of said opening portions remote from said hinge portions each having a plurality of slits defined therein, said slits each Substantially connecting edges of said opening portions which define said respective corner portion, and
   further comprising substantially circular through holes respectively formed in opposite end portions of each of said hinge portions.

* * * * *